US010825242B2

(12) United States Patent
Hong et al.

(10) Patent No.: US 10,825,242 B2
(45) Date of Patent: Nov. 3, 2020

(54) METHOD FOR DESIGNING A THREE DIMENSIONAL MODELED OBJECT IN A THREE DIMENSIONAL SCENE BY EXTRUDING A CURVE

(71) Applicant: Dassault Systemes, Velizy Villacoublay (FR)

(72) Inventors: Jean Hong, Villeneuve le Roi (FR); Manfred Köhler, Hannover (DE); Laura Peythieux, Boulogne Billancourt (FR); Christophe Boyer, Mallemort (FR); Frédéric Letzelter, Longjumeau (FR); Robert Beraud, Chateauneuf les Martigues (FR); Mathieu Gunther, Le Chesnay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 630 days.

(21) Appl. No.: 14/629,936

(22) Filed: Feb. 24, 2015

(65) Prior Publication Data
US 2015/0243075 A1    Aug. 27, 2015

(30) Foreign Application Priority Data

Feb. 24, 2014  (EP) .................................... 14305249

(51) Int. Cl.
*G06T 17/10* (2006.01)
*G06T 19/20* (2011.01)
(Continued)

(52) U.S. Cl.
CPC .......... *G06T 17/10* (2013.01); *G06K 9/00208* (2013.01); *G06K 9/00214* (2013.01);
(Continued)

(58) Field of Classification Search
CPC ..... G06T 17/10; G06T 3/0006; G06T 3/4007; G06T 11/203; G06T 19/20;
(Continued)

(56) References Cited

U.S. PATENT DOCUMENTS 5,581,672 A    12/1996 Letcher, Jr.
8,334,869 B1   12/2012 Padmaker et al.
(Continued)

FOREIGN PATENT DOCUMENTS

EP    1 562 130 A1    8/2005
EP    2 141 617 A1    1/2010

OTHER PUBLICATIONS

Eggli et al. "Inferring 3D models from freehand sketches and constraints", Computer-Aided Design, vol. 20, No. 2, pp. 101-112, 1997.*

(Continued)

*Primary Examiner* — Saptarshi Mazumder
(74) *Attorney, Agent, or Firm* — Hamilton, Brook, Smith & Reynolds, P.C.

(57) ABSTRACT

According to an embodiment of the invention, there is provided a computer-implemented method for designing a three dimensional modeled object in a three dimensional scene, wherein the method comprises the steps of: providing a first curve; duplicating the first curve to obtain a second curve; determining a set of at least one starting point belonging to the first curve; determining a set of at least one target point belonging to the second curve, each target point being associated at least one starting point; linking the relevant points with their associated target points by using at least a connecting curve.

17 Claims, 7 Drawing Sheets

(51) Int. Cl.
*G06K 9/00* (2006.01)
*G06T 3/00* (2006.01)
*G06T 3/40* (2006.01)
*G06T 11/20* (2006.01)

(52) U.S. Cl.
CPC .......... *G06T 3/0006* (2013.01); *G06T 3/4007* (2013.01); *G06T 11/203* (2013.01); *G06T 19/20* (2013.01); *G06T 2207/10028* (2013.01); *G06T 2207/20096* (2013.01); *G06T 2210/12* (2013.01); *G06T 2210/62* (2013.01); *G06T 2219/2004* (2013.01); *G06T 2219/2021* (2013.01)

(58) Field of Classification Search
CPC .. G06T 2219/2004; G06T 2207/10028; G06K 9/00208; G06K 9/00214
See application file for complete search history.

(56) References Cited

U.S. PATENT DOCUMENTS

| | | | |
|---|---|---|---|
| 2008/0030500 A1* | 2/2008 | Krishnan | G06T 15/08 345/424 |
| 2009/0284550 A1* | 11/2009 | Shimada | G06F 17/5095 345/619 |
| 2013/0127836 A1* | 5/2013 | Joshi | G06T 19/00 345/419 |
| 2015/0354965 A1* | 12/2015 | Bandyopadhyay | H04W 64/00 701/494 |

OTHER PUBLICATIONS

Qin et al. "From on-line sketching to 2D and 3D geometry: a system based on fuzzy knowledge", Computer-Aided Design 32 (2000) pp. 851-866.*
Heckbert et al. "Survey of polygonal surface simplification algorithms." Carnegie-Mellon Univ Pittsburgh PA School of Computer Science, 1997.*
Eggli, L., et al., "Inferring 3D Models From Freehand Sketches and Constraints," *Computer Aided Design*, 29(2):101-112 (Feb. 1997).
Heckbert, P.S., et al., "Survey of Polygonal Surface Simplification Algorithms," *Computer Graphics Proceedings*, pp. 1-29 (May 1997).
Kim, D.H., et al., "A New Modeling Interface for the Pen-Input Displays," *Computer Aided Design*, 38(1): 210-223 (Mar. 2006).
Olsen, L., et al., "Sketch-Based Modeling: Survey," *Computers and Graphics*, 33(1):85-103 (Feb. 2009).
Kang, Y., et al., "Feature-based 3D CAD Modeling on Smart Device Using Multi-Touch Gesture," *International Journal of CAD/CAM*, 13(2): 49-62 (Dec. 6, 2012).
Yoon, S.H., et al., "Significant Point Detection and Boundary Representation With Lines and Circular Arcs, Using a Scanning Box Method," *Proceedings of Southeast Conference.*, Williamsburg, Apr. 7-10, 1991.
European Search Report for EP 14 30 5249 dated Jul. 9, 2014.

* cited by examiner

METHOD FOR DESIGNING A THREE DIMENSIONAL MODELED OBJECT IN A THREE DIMENSIONAL SCENE BY EXTRUDING A CURVE

RELATED APPLICATIONS

This application claims priority under 35 U.S.C. § 119 or § 365 to European Application No. 14305249.6, filed Feb. 24, 2014.

The entire teachings of the above application are incorporated herein by reference.

TECHNICAL FIELD

This invention relates to a method, a system and a computer program for designing a three dimensional modeled object in a three dimensional scene by extruding a curve. It is particularly, but not exclusively, applicable to the field of designing modeled objects in a Computer-Aided Design application.

BACKGROUND OF THE INVENTION

Product edition systems are known to include Computer-Aided Design or CAD, which relates to software solutions for authoring product design. A number of product and programs are offered on the market for the design of objects (or parts) or assemblies of objects, forming a product, such as the one provided by Dassault Systèmes under the trademark CATIA.

In the context of CAD, by the expressions "modeled object", "3D modeled object" or "tri-dimensional modeled object", it is meant any object representing a product such as a part or as an assembly of parts which is modeled by data allowing its 3D representation.

The design of an object refers to the process of creating 3D modeled object before creating a mock-up of this object. In the context of creative design, the creation of a 3D modeled object may comprise two steps. The first step is a sketch step wherein one or several rough curves are created. At this stage, the drawings are bi-dimensional (but can be expressed/displayed in a tri-dimensional environment). The second step is a tracer step wherein a 3D drawing which corresponds to the 3D modeled the object is designed from a sketch.

In order to obtain the final version of the 3D modeled object, several iterations may be requested as the creative designer is generally different from the surface designer.

The enhancement called CATIA Natural Sketch adds features allowing to use initial rough curves as support, as well as surfaces. It provides the designers with the ability to draw in 3D by using directly the work already done during the drawing of rough curves. The process is more efficient, quick and intuitive as it is not anymore required to draw the same model twice anymore. An objective of this product is to allow an observer of an object which is designed by a creative designer to have a comprehensive tridimensional view of the said object. For that purpose, the creative designer may choose one or several curves and place them over the bi-dimensional object in order to reveal its 3D aspect.

This technique however suffers several limitations, especially when ones want to generate a 3D object by extrusion of curves.

In this specification, extruding should be understand as the action of displacing a second curve which is a duplicated version of an initial curve, with the effect of sweeping the initial curve in a way that a 3D shape is generated. FIGS. 1 and 2 are two simple examples of extrusion wherein one can see an initial surface 100, 200, a second surface 101, 201 and the 3D extruded shape 102, 202. However, the example is based on surfaces (initial and second surfaces) and not curves.

The major concern related to curve based extrusion is that the observers may have difficulties to apprehend the shape in the tridimensional space. This is particularly true for complex 3D shapes.

SUMMARY OF THE INVENTION

According to the invention, there is provided a computer-implemented method for designing a three dimensional modeled object in a three dimensional scene. The method comprises the steps of: providing a first curve; duplicating the first curve to obtain a second curve; determining a set of at least one starting point belonging to the first curve; determining a set of at least one target point belonging to the second curve, each target point being associated at least one starting point; linking the relevant points with their associated target points by using at least a connecting curve. The steps may be implemented, for example, by a processor.

In one aspect of the invention, the method comprises a step wherein a transformation is applied to the second curve, this transformation being chosen among normal translation, planar translation, axis rotation, planar rotation, stretching or uniform scaling.

In one embodiment, the starting points are distributed uniformly along the initial curve.

Alternatively, the starting points can be determined by identifying the local extrema of the initial curve.

In one aspect of the invention, a point of the first curve which is an inflexion point can be considered as a starting point.

In one embodiment, the first curve is of geometrical type.

For example, a point belonging to the first curve is identified as a starting point each time the first derivative in respect one of the dimensions of a local reference associated to said first curve becomes zero and changes sign.

In another embodiment of the invention, the first curve is defined by at least one stroke.

According to one aspect of the invention, the method comprises the steps of: individually discretizing each stroke of the curve to obtain a first set of points; applying a distance filter on the first set of point to obtain a second set of points; applying on the second set of points the Douglas Peucker Ramer algorithm with a predefined threshold TH_DPR in order to identify the local extrema of the first curve.

TH_DPR can be chosen equal to one quarter of the length of the longest side of the bounding box surrounding the first curve.

In one embodiment, the ends of the first curve are identified as starting points.

The connecting curves can be made of simple segments, Bezier curves or NURBS curves.

A connecting curve may be, for example, a bi-dimensional curve associated to a plane which is by default orthogonal to the tangent of the first curve at the starting point and to the tangent of the second curve at the target point.

According to the invention, there is also provided a computer program product, stored on a computer readable medium comprising code means for causing a computer to implement the method described above.

According to the invention, there is also provided an electronic device comprising at least one central processing unit; a screen; memory; at least one module stored in the memory and configured for execution by the at least one central processing unit. The at least one module including instructions to provide a first curve; to duplicate the first curve to obtain a second curve; to determine a set of at least one starting point belonging to the first curve; to determine a set of at least one target point belonging to the second curve, each target point being associated at least one starting point; and to link the relevant points with their associated target points by using at least a connecting curve.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
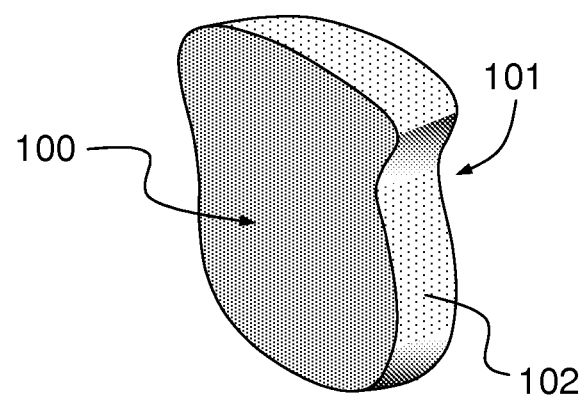
FIGS. 1 and 2 show two simple examples of extrusion using surfaces.
Figure 2:
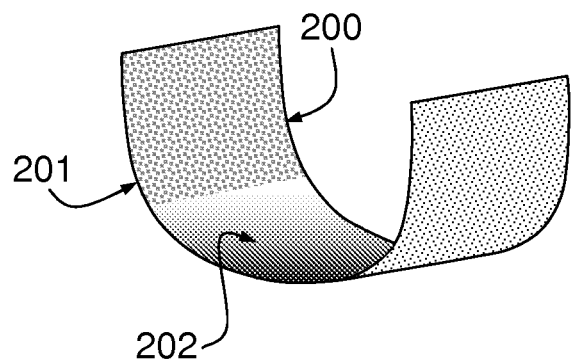

A description of example embodiments of the invention follows.

The teachings of all patents, published applications and references cited herein are incorporated by reference in their entirety.

The method according to an embodiment of the invention is computer-implemented. This means that the steps (or substantially all the steps) of the method are executed by at least one computer. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

The method and system aims at designing modeled objects. A modeled object is any object defined by data stored in the memory and which represents a physical product, an industrial product or a mechanical (to be produced or manufactured).

A CAD system is any system suitable at least for designing a modeled object on the basis of a graphical representation of the modeled object, such as CATIA. Thus, the data defining a CAD modeled object comprise data allowing the representation of the modeled object (e.g. geometric data, for example including relative positions in space). A CAD modeled object is also referred to as a geometrical modeled object, and a three-dimensional CAD modeled object is also referred to as three-dimensional geometrical modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file may contain specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

A CAD system may also provide a representation of modeled objects using pixel-based geometry. A pixel-based geometry modeled object (referred hereinafter to as modeled object) uses pattern of pixel for ordering pixels. Lines, edges, or surfaces may be represented by pixel-based geometry. Specifically, a CAD file may contain specifications, from which pixels may be generated, which in turn allows for a representation to be generated. Specifications of the modeled object may be stored in a single CAD file or multiple ones. It has to be understood that a pixel-based geometry modeled object is an object without properties defined by mathematical equations, conversely to a geometrical modeled object.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. The display of a 3D representation facilitates design (i.e. increases the speed at which designers statistically accomplish their task). This speeds up the manufacturing process in the industry, as the design of the products is part of the manufacturing process.

The CAD system and the user can interact but not necessarily through a touch screen. Touch screens are commonly used in many electronic devices and systems to display text and/or modeled objects. They are also known as touch-screens, touchscreens or touch sensitive displays. The user is able to interact with a touch screen through a user interface comprising user interface objects. A touch screen device detects and responds to contact on the touch screen. Thus, the user is able to activate a function, trigger a process or manipulate modeled objects by contacting the touch screen with one finger, several fingers (multi-touch gesture) or a stylus at locations corresponding to the user interface objects he wants to interact with. A user interface object can be a soft key, a menu or a graphic.

Figure 3:
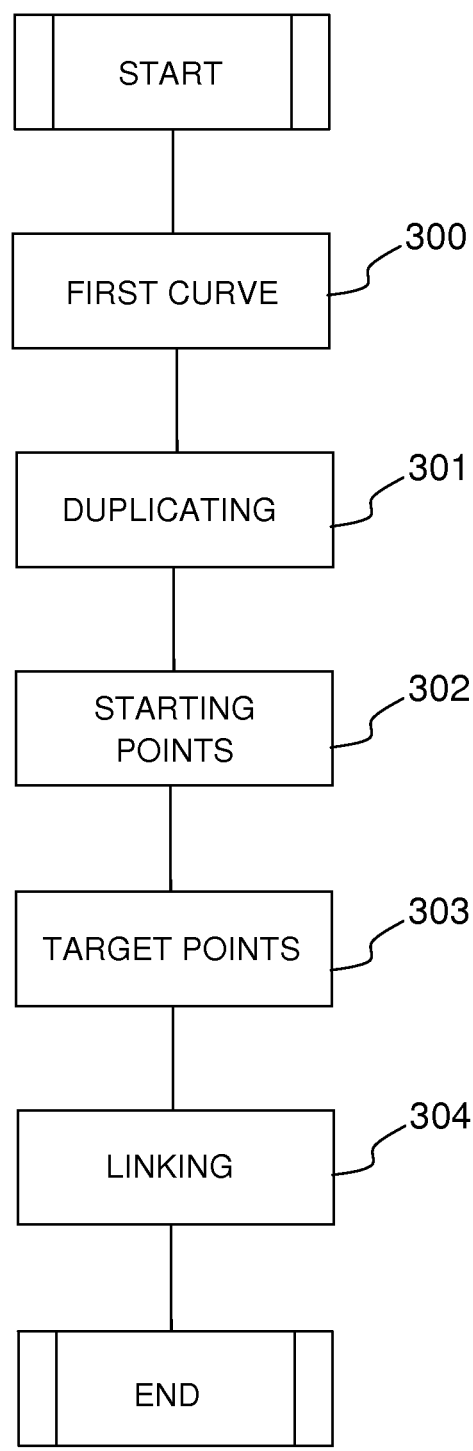
FIG. 3 is a flow diagram illustrating a method for designing a 3D modeled object displayed in a three 3D scene.
Figure 4A:
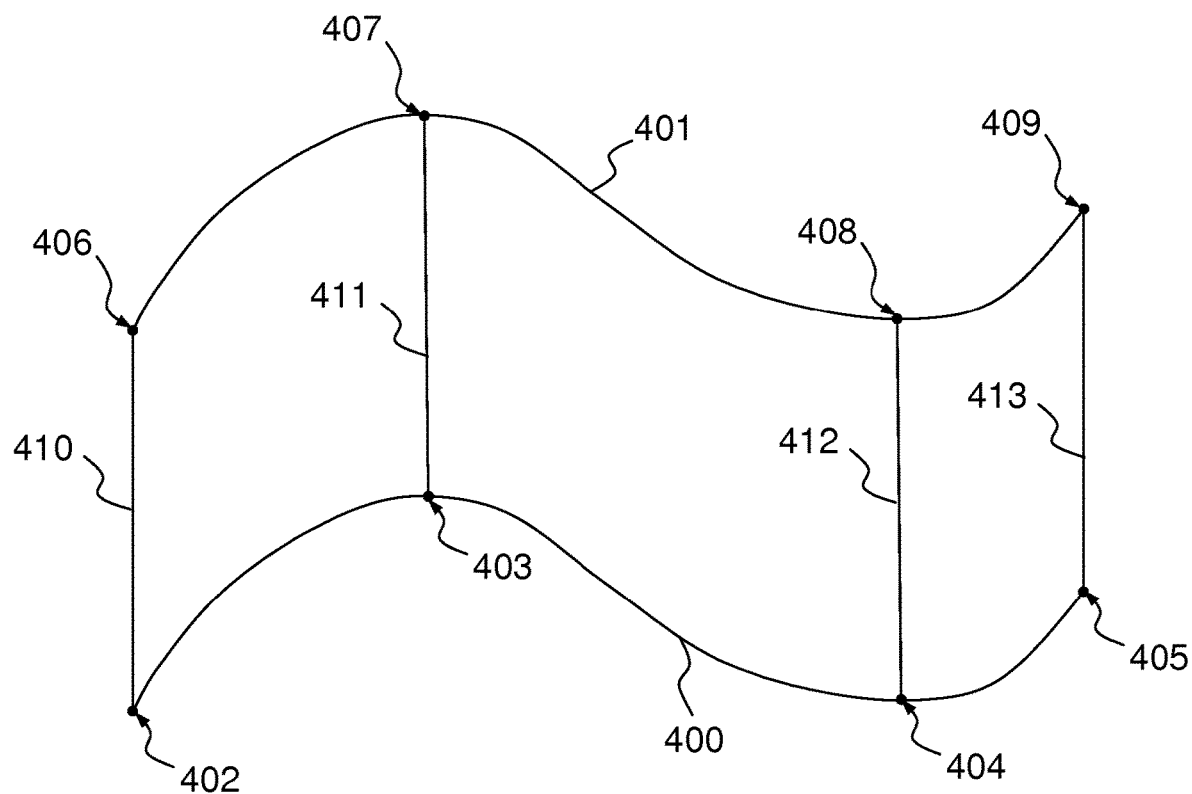
FIGS. 4a-4b show simple examples of a three dimensional shape which can be obtained by the invention.
Figure 4B:
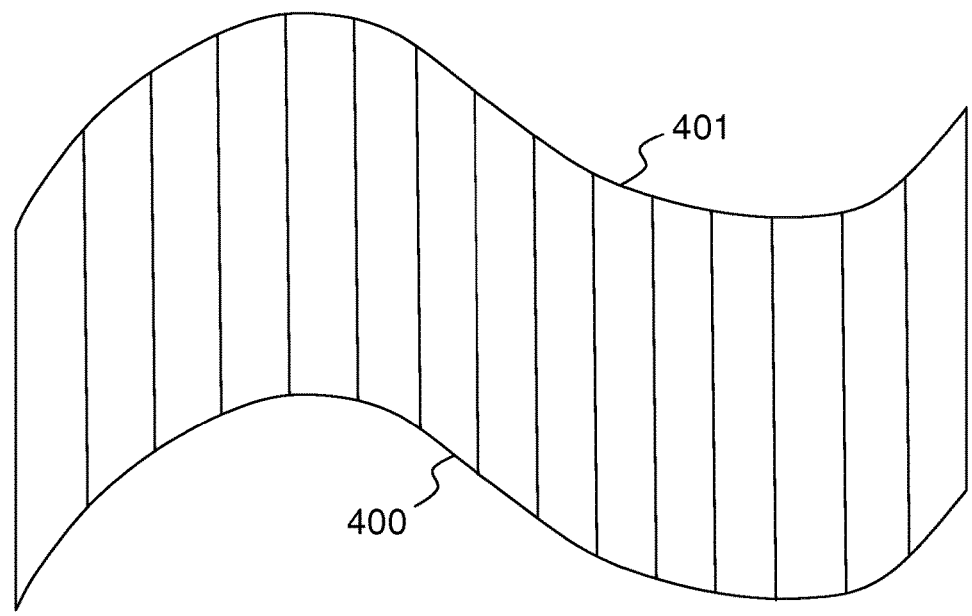

FIG. 3 is a flow diagram illustrating a method for designing a 3D modeled object displayed in a three 3D scene and FIGS. 4a and 4b show a simple example of a three dimensional shape which can be obtained by the invention.

As already mentioned, the invention is applicable for extrusion based on curves, extruding being the action of displacing a second curve which is a duplicated version of an initial curve, with the effect of sweeping the initial curve in a way that a 3D shape is generated.

This method comprises a first step 300 which provides a first curve 400. For example, said curve can be provided by selecting a curve that is already displayed on the screen of the computer. The curve can be selected by pressing an activation zone with a finger of with a stylus. An activation zone is a geometric figure associated to the curve defining an area located around/near the modeled object and which can be displayed or hidden. As an example, the activation zone surrounds the modeled object. A bounding box can be used for that purpose. As an example, a modeled object is selected if its associated activation zone is pressed for more than a predefined amount of time Ts.

Alternatively, this first curve can be generated by the user either by drawing it or by selecting a curve into a digital library provided by the CAD system.

Figure 5:
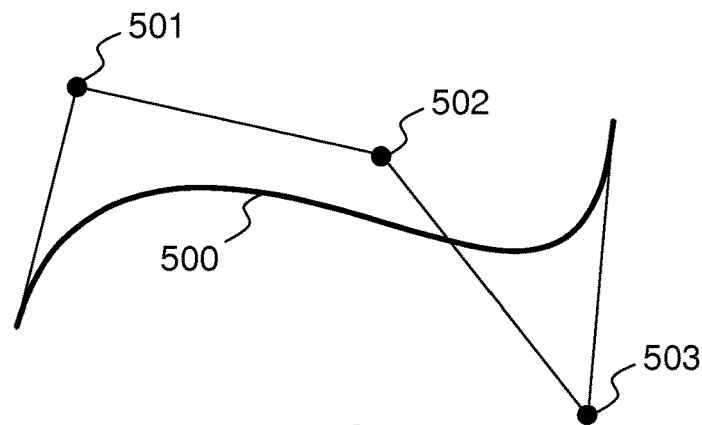
FIG. 5 gives an example of a geometrical curve associated to three control points.

Besides, the first curve can be of geometrical type which means that it is defined with a mathematical formula. For example, the user can modify its shape by displacing one or several control points. A control point is a point that is associated to a geometrical curve and which can be displaced by the user in order to change the shape of the curve. The effect of displacing a control point would be to modify one or several parameters of the mathematical formula defining the curve. FIG. 5 gives an example of a geometrical curve 500 associated to three control points 501-503.

Alternatively, the first curve can be defined by a pixel model. A pixel model corresponds to a set of at least one stroke. By user interacting with the screen, the user activates one or several pixels on the screen. These pixels may be translated in a stroke as known in the art. For example, if the user-interacting is performed through a finger or through a stylus, the pixels activated correspond to the location of the finger or of the stylus. These activated pixels may be dynamically displayed on the screen. The activated pixels may be translated in a stroke which generally means locating positions on a screen which visually form a continuous line. The display can be done for example by keeping track of the position of at least some of the pixels activated on the screen. Thus the stroke corresponds to the user-interacting in the sense that is derived from what is sketched by the user through the user-interacting.

In a second step 301 of the method according to the invention, the first curve 400 is duplicated in order to obtain a second curve 401.

The initial curve may be duplicated by using the software tools that are provided by the GUI (Graphical User Interface). For example, the GUI may comprise standard menu bars, as well one or several toolbars. Such menu and toolbars contain a set of user-selectable icons, among which one icon is associated with the duplication function that can be triggered for a curve selected by the user, as known in the art. Preferably the first and second curve do not overlap, or at least they do not overlap completely. Even more preferably, the second curve lies outside a plane containing the first curve.

Then, a step 302 identifies at least one point located belonging the first curve which is called "starting point" in this description. In a preferred embodiment, the starting points are found by identifying the local extrema of the initial curve. In this description, the expression "local extrema" includes both local minima and maxima.

Additionally, the ends of the initial curve may also be considered as starting points.

In the example of FIG. 4a, four starting points 402-405 are identified, including two local extrema 403, 404 and the two ends 402, 405 of the initial curve 400. Alternatively, the starting points can be distributed uniformly along the initial curve, as shown in FIG. 4b.

Several alternatives may be considered to determine the number and location of the starting points taking into account, for example, the type to which the initial curves belongs (i.e. geometrical curve or pixel model).

A set of target points 406-409 is determined 303 on the second curve. In a preferred embodiment, the number of target points is the same as the number S of starting points and each target point is associated to one of the starting point, thus defining S pairs of points.

Therefore, in this description a starting point is a point which belongs to the initial curve and to which is associated a set of parameters. Similarly, a target point is a point which belongs to duplicated curve and to which is associated a set of parameters.

As an example, a target point can be chosen as the point on the duplicated curve which corresponds to its associated starting point on the initial curve. For example, the coordinates of the starting point expressed in a referential associated to the initial curve are similar to the coordinates of the target point expressed in a referential associated to the duplicated curve.

Figure 10A:
FIGS. 10a-10e depict different transformations, which can be applied to the second curve.
Figure 10B:
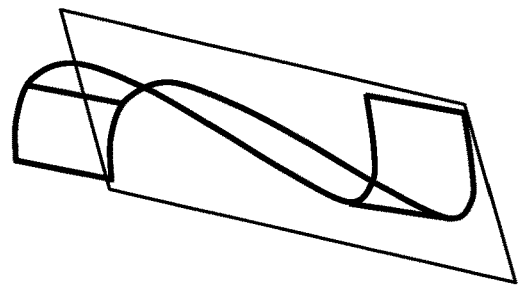
Figure 10C:
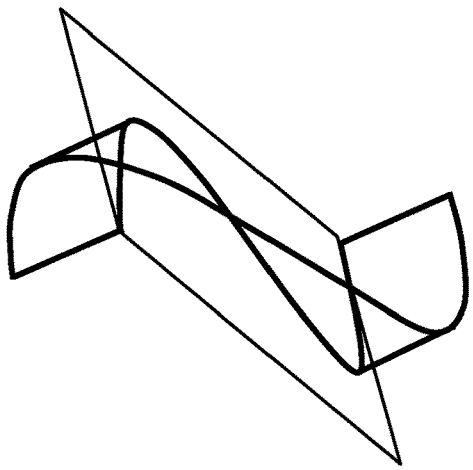
Figure 10D:
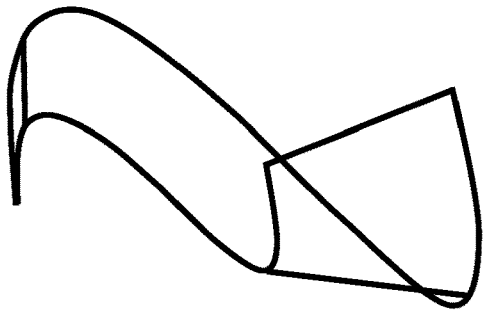
Figure 10E:
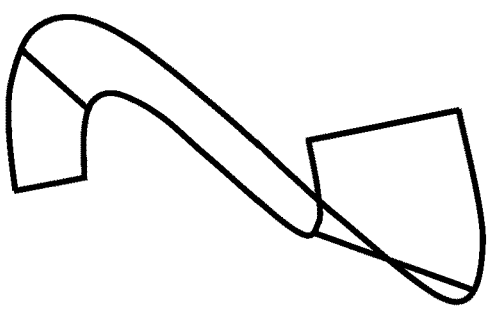

In one embodiment, at least one transformation can be applied on the second curve. This transformation corresponds for example to a normal translation (FIG. 10a), a planar translation (FIG. 10b), an axis rotation (FIG. 10c), a stretching (FIG. 10d) or a uniform scaling (FIG. 10e). Combining two or more of said transformations allows the user to build quickly and easily a 3D complex extruded shape made only by curves, with only few commands. A particular advantageous case is that wherein a combination of at least a first and a second transformation is applied (in any order) to the second curve, the first transformation being chosen among axis rotation and stretching and the second transformation being chosen among normal translation, planar translation, axis rotation, stretching or uniform scaling.

The step which determines the target points can be applied after the transformation of the duplicated curve by using the same method as the one that has been user to find the starting points. Alternatively, the target points can be determined before the transformation (i.e., just after the duplication) and then, their parameters (i.e. their coordinates) can be updated by applying the same transformation that has been applied to the duplicated curve.

Then, the method comprises a step 304 wherein S connecting curves 410-413 are added to the displayed shape. A connecting curve is a curve which is linking a starting point and a target point which belong to the same pair. One of the main advantages of the invention is that even complex extruded shapes are becoming understandable as the 3D is revealed by the connected curves.

A connecting curve can be chosen, for example, among a simple segment, a Bezier curve (also called spline) or a NURBS curve (Non-Uniform Rational Basis Splines). The skilled person will appreciate that other kind of curves (2D or 3D) can be advantageously chosen by the user will designing the 3D shape.

As an example, a connecting curve can be chosen as a bi-dimensional curve associated to a plane which is by default orthogonal to the tangent of the initial curve at the starting point and to the tangent of the duplicated curve at the target point. Advantageously, when the designer wants to modify the connecting curve, he can simply manipulate one of the control points associated to the connecting curve and move it as he wants in the plane associated to the linking curve.

Figure 6A:
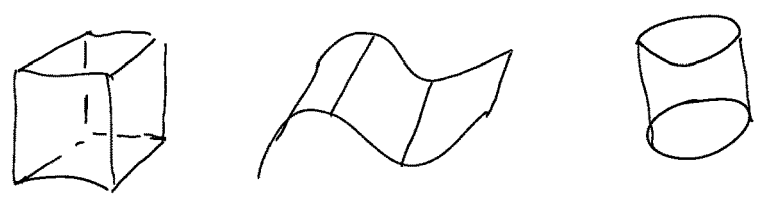
FIGS. 6a and 6b represent various 3D shapes for which several connecting curves have been added.
Figure 6B:
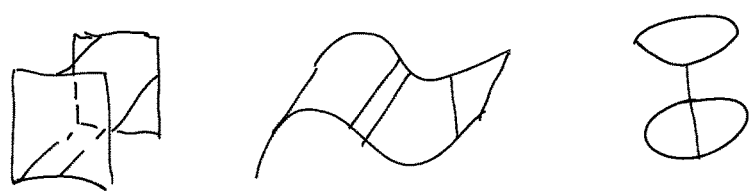

FIGS. 6a and 6b represent various 3D shapes for which several connecting curves have been added. On FIG. 6a, the three dimensional aspect is revealed to the user thanks to the connecting curves whereas on FIG. 6b, the connecting curves do not provide any support for the user to understand the shape in a three dimensional space. It shows that the position and number of connecting curves is essential.

Figure 7:
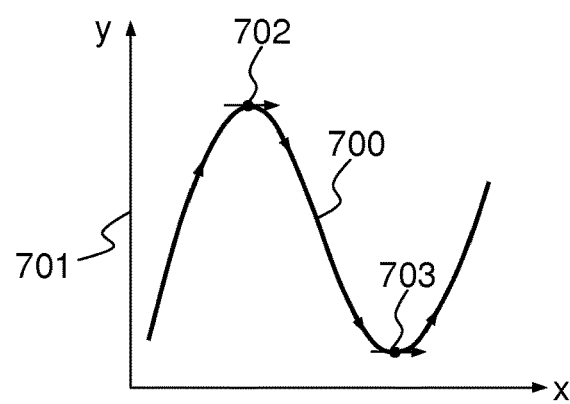
FIG. 7 illustrates a first technique for determining the starting points.

FIG. 7 illustrates a first technique for determining the starting points. As described before, a way to determine the number and the location of the starting points is to identity the local extrema of the initial curve. Indeed, a curve is considered as complex when there is a significant number of local extrema.

In this example, a 2D geometrical curve 700 is taken as an initial curve. The initial curve is associated to a local reference 701 with two axis x and y. A starting point is identified each time the first derivative in respect to the variable x becomes zero and changes sign. Based on this identification criteria, two target points 702, 703 for which the tangents 704, 705 are flat have been identified on the geometrical curve 700.

In addition or alternatively, inflection point can also be used as starting points. An inflexion point is a point at which the concavity of the curve changes signs i.e. a point at which the second derivative changes sign.

Figure 8A:
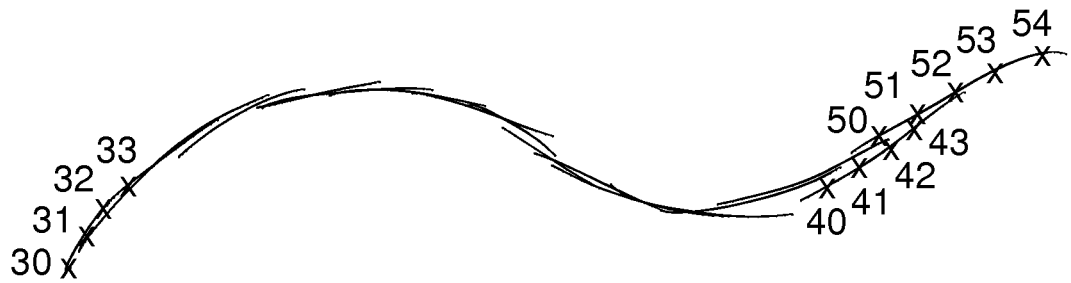
FIGS. 8a-8c illustrate a second technique for determining the starting points.
Figure 8B:
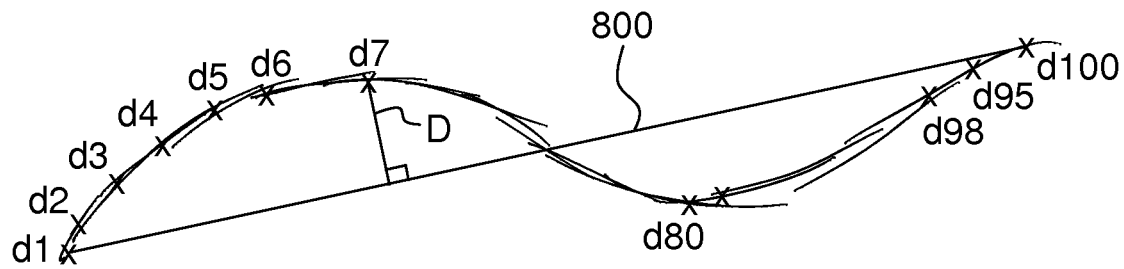
Figure 8C:
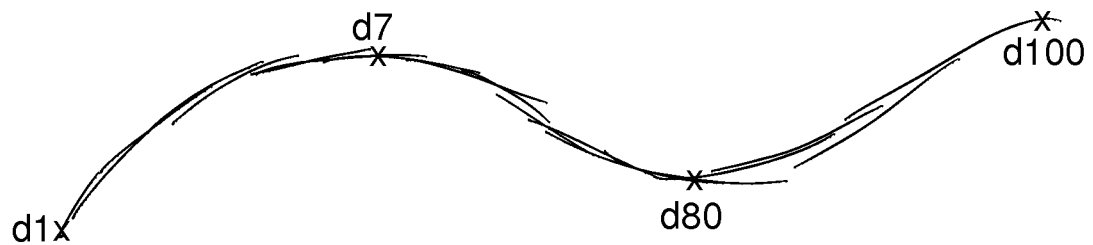

FIGS. 8a-8c illustrate a second technique for determining the starting points. This technique is particularly suitable for curves described by pixel models. In that case, the initial curve is generally composed of several strokes. A first process is applied to the initial curve in order to identify each stroke of the curve and to perform an individual discretization of each stroke (FIG. 8a). Then, a distance filtering is applied to points which have been identified by the discretization process. The result is a discrete curve as shown on FIG. 8b.

The Douglas Peucker Ramer (DPR) algorithm is then applied to the discrete curve. This iterative algorithm allows to simplify a discrete curve by reducing the number of points. Advantageously, only the local extrama d7, d80 and the ends d1, d100 remain when the curve is simplified enough (see FIG. 8c). For that purpose, the algorithm should be configured properly which is described hereafter.

The input of the DPR algorithm is the ordered set of points corresponding to the distance filter output. Then, a segment 800 which is defined by the first and the last point of the discrete curve d1-d100 is recursively divided. Then, the algorithm finds out which point of the discrete curve d1-d100 is the furthest from the segment 800. If the distance D between this point d7 and the segment 800 is less or equal than a predefined threshold TH_DPR, any points located between the first point d1 and the last point d100 of segment 800 are discarded. On the contrary, if the distance between this point and the segment 800 is greater than the predefined threshold TH_DPR, two sub-segments are defined and the same process is applied recursively. Therefore, a simplified curve can be defined and only the boundaries d1, d100 and the local extrema d7, d80 are be kept when the threshold TH_DPR is appropriately chosen.

In a preferred embodiment, the threshold is chosen as a function of the bounding box surrounding the discrete curve, a bounding box being defined as the smallest rectangle (for a 2D curve) or the smallest parallelepiped (for a 3D curve) within which all the points of the curve lie. In an embodiment, TH_DPR can be chosen equal to one quarter of the length of the longest side of the bounding box.

Figure 9:
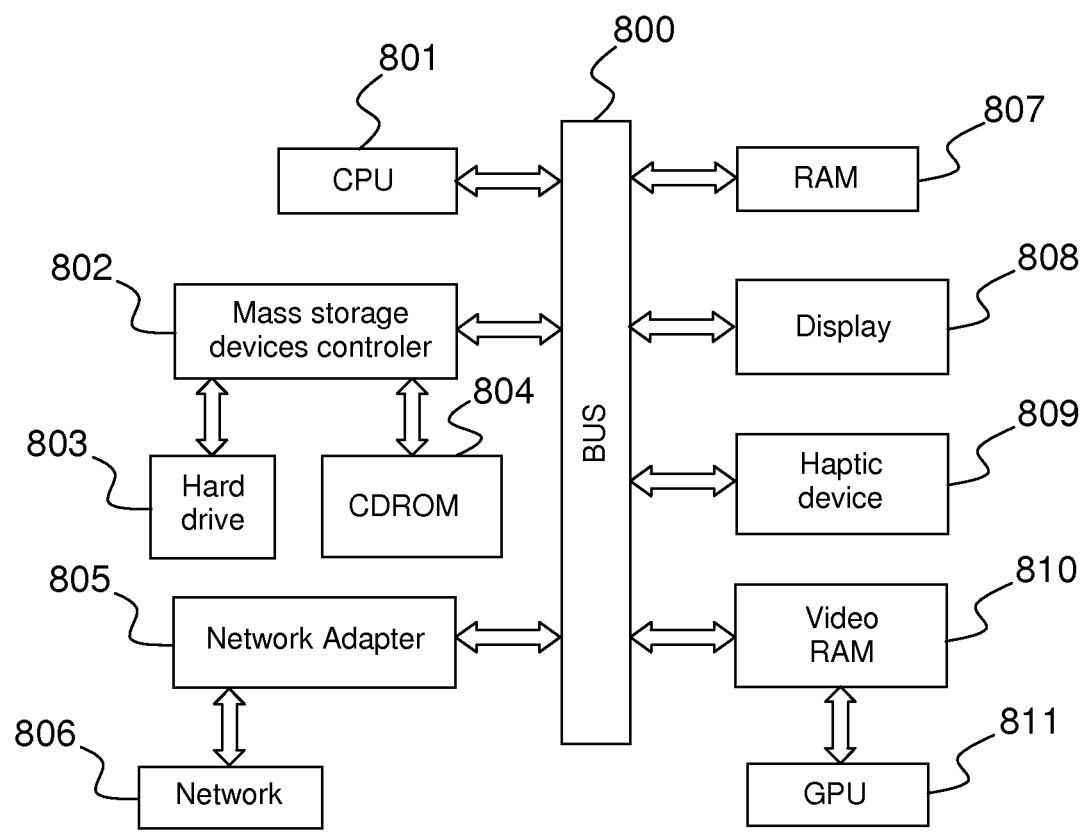
FIG. 9 shows a client computer system, e.g., a workstation of a user.

FIG. 9 shows a client computer system, e.g. a workstation of a user. The client computer comprises a central processing unit (CPU) 901 connected to an internal communication BUS 900, a random access memory (RAM) 907 also connected to the BUS. The client computer is further provided with a graphical processing unit (GPU) 911 which is associated with a video random access memory 910 connected to the BUS. Video RAM 910 is also known in the art as frame buffer. A mass storage device controller 902 manages accesses to a mass memory device, such as hard drive 903. Mass memory devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks 904. Any of the foregoing may be supplemented by, or incorporated in, specially designed ASICs (application-specific integrated circuits). A network adapter 905 manages accesses to a network 906. The client computer may also include a haptic device 909 such as cursor control device, a keyboard or the like. A cursor control device is used in the client computer to permit the user to selectively position a cursor at any desired location on display 908. In addition, the cursor control device allows the user to select various commands, and input control signals. The cursor control device includes a number of signal generation devices for input control signals to system. Typically, a cursor control device may be a mouse, the button of the mouse being used to generate the signals.

The systems, methods and configurations as described above and in the drawings are for ease of description only and are not meant to restrict the apparatus or methods to a particular arrangement or process in use.

As noted above, the methods and systems described are merely exemplary and the skilled person would appreciate that a number of alternatives exist to implement aspects of the invention. Indeed, the skilled person would appreciate that the steps of the method can be applied in different sequences. For example, the initial and duplicated curves can be determined before determining the starting and target points or alternatively, the starting points can be determined before the initial curve duplication.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for designing a three dimensional modeled object in a three dimensional scene in a system of computer-aided design (CAD), computer-aided manufacturing (CAM) or computer aided engineering (CAE), wherein the method comprises the steps of:
   providing a first curve in the three dimensional scene;
   duplicating the first curve to obtain a second curve in the three dimensional scene;
   automatically, by a processor, determining a set of at least one starting point belonging to the first curve;
   automatically, by the processor, determining a set of at least one target point belonging to the second curve, each target point being associated at least one starting point;
   linking the relevant points with their associated target points by using at least a connecting curve;
   applying at least a transformation to the second curve, this transformation being chosen among axis rotation and stretching, the transformation generating, by the processor, a three dimensional modeled object in the three dimensional scene including the first curve, the second curve, and the connecting curve
   displaying the three-dimensional modeled object having the first curve, second curve, and connecting curve in the CAD, CAM, or CAE system.

2. The method according to claim 1 wherein a combination of at least a first and a second transformation is applied to the second curve, the first transformation being chosen among axis rotation and stretching and the second transformation being chosen among normal translation, planar translation, axis rotation, stretching or uniform scaling.

3. The method according to claim 1 wherein said transformation is applied to the second curve before said step of linking relevant points with their associated target points by using at least a connecting curve.

4. The method according to claim 1 wherein said second curve is obtained outside a plane containing said first curve.

5. The method according to claim 1 wherein, the starting points are distributed uniformly along the first curve.

6. The method according to claim 1 wherein, the starting points are determined by identifying the local extrema of the first curve.

7. The method according to claim 1, wherein a point of the first curve which is an inflexion point is considered as a starting point.

8. The method according to claim 1 wherein the first curve is of geometrical type.

9. The method according to claim 8, wherein a point belonging to the first curve is identified as a starting point each time the first derivative in respect one of the dimensions of a local reference associated to said first curve becomes zero and changes sign.

10. The method according to claim 1, wherein the first curve is defined by at least one stroke.

11. The method according to claim 10, comprising the steps of:

individually discretizing each stroke of the curve to obtain a first set of points;
applying a distance filter on the first set of points to obtain a second set of points;
applying on the second set of points the Douglas Peucker Ramer algorithm with a predefined threshold TH_DPR in order to identify the local extrema of the first curve.

12. The method according to claim 11, wherein TH_DPR is chosen equal to one quarter of the length of the longest side of the bounding box surrounding the first curve.

13. The method according to claim 1, wherein the ends of the first curve are identified as starting points.

14. The method according to claim 1, wherein connecting curves are simple segments, Bezier curves or NURBS curves.

15. The method according to claim 1, wherein a connecting curve is a bi-dimensional curve associated to a plane which is by default orthogonal to the tangent of the first curve at the starting point and to the tangent of the second curve at the target point.

16. A computer program product, stored on a non-transitory computer readable medium comprising code for causing a computer to implement a method for designing a three dimensional modeled object in a three dimensional scene in a system of computer-aided design (CAD), computer-aided manufacturing (CAM) or computer aided engineering (CAE), wherein the method comprises the steps of:
   providing a first curve in the three dimensional scene;
   duplicating the first curve to obtain a second curve in the three-dimensional scene;
   automatically determining a set of at least one starting point belonging to the first curve;
   automatically determining a set of at least one target point belonging to the second curve, each target point being associated at least one starting point;
   linking the relevant points with their associated target points by using at least a connecting curve;
   applying at least a transformation to the second curve, this transformation being chosen among axis rotation and stretching, the transformation generating a three dimensional modeled object in the three dimensional scene including the first curve, the second curve, and the connecting curve; and
   displaying the three-dimensional modeled object having the first curve, second curve, and connecting curve in the CAD, CAM, or CAE system.

17. An electronic device comprising:
   at least one central processing unit;
   a screen;
   a non-transitory memory;
   at least one module stored in the memory and configured for execution by the at least one central processing unit, the at least one module including instructions:
   to provide a first curve in the three dimensional scene in a system of computer-aided design (CAD), computer-aided manufacturing (CAM) or computer aided engineering (CAE);
   to duplicate the first curve to obtain a second curve in the three dimensional scene;
   to automatically determine a set of at least one starting point belonging to the first curve;
   to automatically determine a set of at least one target point belonging to the second curve, each target point being associated at least one starting point;
   to link the relevant points with their associated target points by using at least a connecting curve;

to apply at least a transformation to the second curve, this transformation being chosen among axis rotation and stretching, the transformation generating a three dimensional modeled object in the three dimensional scene including the first curve, the second curve, and the connecting curve; and to display the three-dimensional modeled object having the first curve, second curve, and connecting curve in the CAD, CAM, or CAE system.

\* \* \* \* \*